C. R. EDWARDS.
Walking Planter.
No. 107,467. Patented Sept. 20, 1870.
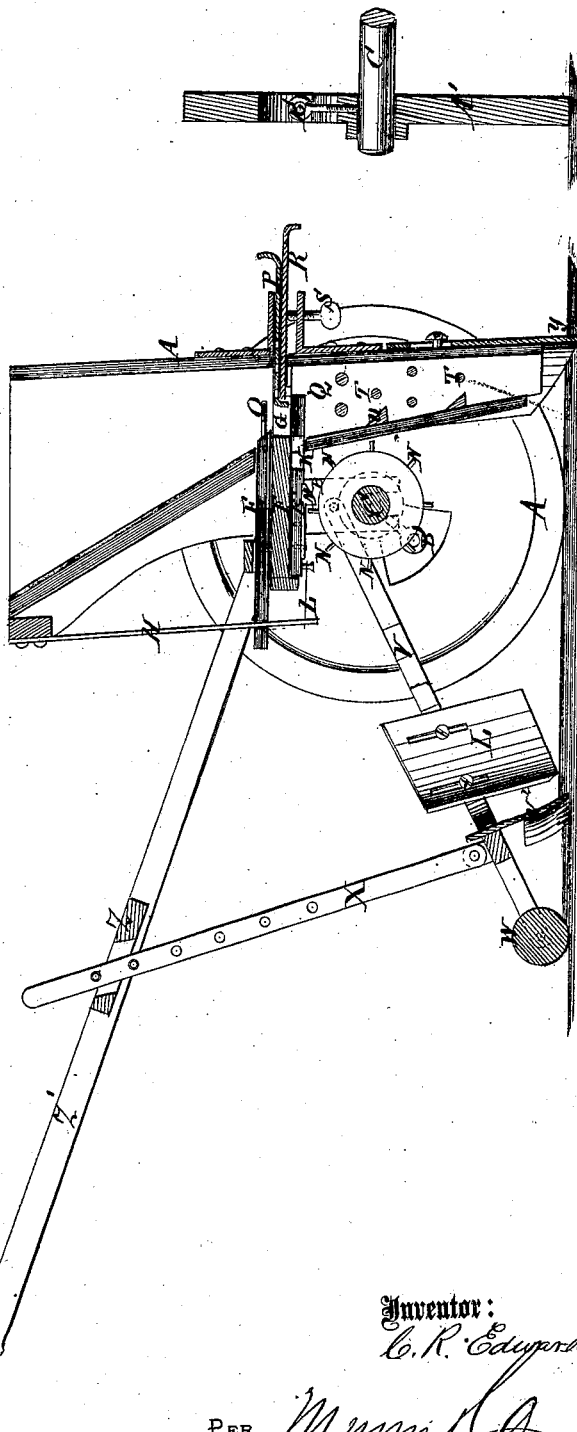
Inventor:
C. R. Edwards
Witnesses:

United States Patent Office.

CLEMENT R. EDWARDS, OF BOWLING GREEN, KENTUCKY.

Letters Patent No. 107,467, dated September 20, 1870.

IMPROVEMENT IN SEED-PLANTERS.

The Schedule referred to in these Letters Patent and making part of the same

*To all whom it may concern:*

Be it known that I, CLEMENT R. EDWARDS, of Bowling Green, in the county of Warren and State of Kentucky, have invented a new and improved Seed-Planter; and I do hereby declare that the following is a full, clear, and exact description thereof, which will enable others skilled in the art to make and use the same, reference being had to the accompanying drawing forming part of this specification.

My invention relates to seed-droppers, and consists in an improvement whereby they are adapted to sow seeds of varying sizes.

Figure 1 is a sectional elevation of my improved machine, and

Figure 2 is a section through one of the wheels.

Similar letters of reference indicate corresponding parts.

A is the hopper and dropping-slide support, mounted in suitable bearings, B, on the revolving axle C.

E is a cut-off slide, arranged to work into the bottom of the hopper, above the plate F, in which is a measuring seed-space, G.

A spring-plate, H, attached to the hopper, passes at the other end through the outer end of this slide.

I is the dropping-slide, working under the plate F, and having a hole, K, through the feeding-end.

This slide is connected to the spring H by a cord or wire line, L, and has a stud, M, which is acted on by the projections N on the shaft C, or a disk thereon.

It will be seen that, by this arrangement, the end slides move forward and back together, and, when it is observed that the hole K comes under the space G, after the said space has been covered by the slide E, it will be seen that the quantity of seed that may be contained in the space G will be dropped, and no more; and that, when the slide E goes back to let the grain into the space G again, the passage from the latter below will be closed by the slide I.

O is a bent wire attached to the end of the slide E for working in the grain above the discharge-orifice, to prevent it from clogging.

In order to vary the capacity of the space G for dropping more or less grain, I introduce, at the opposite side, and in the plane of the top of the plate F, a slide, P, with a plate, Q, at the end, extending down as low as the bottom of the plate F, and arranged to slide in and out, to widen or narrow the space.

And, for sowing very small seed, I perforate the plate F, and place below it another slide, R, which may be used to cover more or less of the perforations, when the slide F extends wholly across the space G.

S is a set-screw to hold these slides in place.

I propose to introduce pins, T, and projections, U, in the spout below the feeding-apparatus, for scattering the grain as it falls to the ground.

V represents arms pivoted to the supports B of the hopper and descending rearward nearly to the ground, where a small guide-roller, W, is mounted, and these arms support a box, X, passing through a cross-bar, Z, connecting the handles Z', by which the apparatus is controlled by the attendant.

The said handles may be adjusted up or down on the bar X, which has holes, and an adjusting-pin for supporting them at any point therein.

By raising these handles, the point $y'$ of the drill-opener is caused to work deeper in the ground, and by depressing them it runs shallower. They may also be raised so high as to elevate the stud M above the reach of pins N when it is desired to stop the movement of the dropping-slides.

These arms V support covering-scrapers, $V^1$ attached so as to be adjusted to cover the grain deeply or shallow, as may be required, and a forked rake or scraper, $V^2$, is placed behind the covering-scrapers, on a cross-bar connecting the arms V, to scrape and level down the ground turned over the grain by the scrapers.

To adjust the wheels A' on the axle C for tracking wide or narrow, I make the axles so that they may be slipped along thereon, and secure them, at the required positions, by the set-screws $B^2$ in holes tapped through the hub.

Having thus described my invention,

I claim as new and desire to secure by Letters Patent—

The arrangement, in a seed-dropper, of the sliding-plate P, having a series of apertures, adjustable plate R, and cut-off slide E, as and for the purpose described.

CLEMENT R. EDWARDS.

Witnesses:
    JAMES D. HINES,
    R. T. HALEY.